US010461585B2

(12) United States Patent
Kamata

(10) Patent No.: US 10,461,585 B2
(45) Date of Patent: Oct. 29, 2019

(54) POWER-RECEIVING DEVICE, WIRELESS POWER-FEEDING SYSTEM INCLUDING POWER-RECEIVING DEVICE, AND WIRELESS COMMUNICATION SYSTEM INCLUDING POWER-RECEIVING DEVICE

(71) Applicant: SEMICONDUCTOR ENERGY LABORATORY CO., LTD., Atsugi-shi, Kanagawa-ken (JP)

(72) Inventor: Koichiro Kamata, Kanagawa (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 0 days.

(21) Appl. No.: 15/884,698

(22) Filed: Jan. 31, 2018

(65) Prior Publication Data

US 2018/0152054 A1 May 31, 2018

Related U.S. Application Data

(63) Continuation of application No. 13/412,175, filed on Mar. 5, 2012, now Pat. No. 9,887,583.

(30) Foreign Application Priority Data

Mar. 10, 2011 (JP) ................................. 2011-053317

(51) Int. Cl.
*H02J 50/00* (2016.01)
*H02J 50/12* (2016.01)
(Continued)

(52) U.S. Cl.
CPC .............. *H02J 50/12* (2016.02); *H02J 5/005* (2013.01); *H02J 7/0027* (2013.01); *H02J 7/025* (2013.01);
(Continued)

(58) Field of Classification Search
CPC ................................. H02J 17/00; H02J 50/00
(Continued)

(56) References Cited

U.S. PATENT DOCUMENTS

| 4,583,099 | A | 4/1986 | Reilly et al. |
| 6,321,067 | B1 | 11/2001 | Suga et al. |

(Continued)

FOREIGN PATENT DOCUMENTS

| EP | 0829940 A | 3/1998 |
| JP | 10-145987 A | 5/1998 |

(Continued)

*Primary Examiner* — Rexford N Barnie
*Assistant Examiner* — Joseph N Inge
(74) *Attorney, Agent, or Firm* — Nixon Peabody LLP; Jeffrey L. Costellia

(57) ABSTRACT

When a portable electronic appliance is provided with two systems, a wireless power-feeding system and a wireless communication system, each system requires two power-receiving devices, a coil and an antenna, leading to a problem of increased electronic appliance size and cost. Wireless power feeding employs the resonance method and uses a resonance coil using the resonance method and a power-receiving coil that receives power from the resonance coil. At least one of the resonance coil and the power-receiving coil can also be used as an antenna for wireless communication. Thus, a power-receiving device that can be used for two systems, wireless power feeding and wireless communication, can be provided.

22 Claims, 7 Drawing Sheets

(51) Int. Cl.
*H02J 50/40* (2016.01)
*H02J 7/02* (2016.01)
*H02J 7/00* (2006.01)
*H02J 17/00* (2006.01)
*H04B 5/00* (2006.01)
*H02J 5/00* (2016.01)

(52) U.S. Cl.
CPC .............. *H02J 17/00* (2013.01); *H02J 50/40* (2016.02); *H04B 5/0037* (2013.01); *H04B 5/0093* (2013.01); *H02J 7/0044* (2013.01)

(58) Field of Classification Search
USPC ........................................................ 307/104
See application file for complete search history.

(56) References Cited

U.S. PATENT DOCUMENTS

| | | |
|---|---|---|
| 6,427,065 B1 | 7/2002 | Suga et al. |
| 7,075,455 B2 | 7/2006 | Nishimura et al. |
| 8,338,991 B2 * | 12/2012 | Von Novak ............ H02J 17/00 307/104 |
| 9,887,583 B2 * | 2/2018 | Kamata ................ H02J 7/0027 |
| 2007/0021140 A1 * | 1/2007 | Keyes, IV .............. H02J 17/00 455/522 |
| 2009/0072782 A1 | 3/2009 | Randall |
| 2009/0096415 A1 | 4/2009 | Beart et al. |
| 2009/0179501 A1 | 7/2009 | Randall |
| 2010/0069039 A1 | 3/2010 | Kawamura et al. |
| 2010/0164296 A1 | 7/2010 | Kurs et al. |
| 2010/0259109 A1 * | 10/2010 | Sato ........................ H02J 7/025 307/104 |
| 2010/0277003 A1 * | 11/2010 | Von Novak ............ H02J 17/00 307/104 |
| 2011/0163609 A1 | 7/2011 | Wada et al. |
| 2011/0187321 A1 * | 8/2011 | Hirayama .............. B60L 11/182 320/108 |
| 2011/0187435 A1 | 8/2011 | Kamata |
| 2011/0291490 A1 | 12/2011 | Shi |
| 2012/0228957 A1 | 9/2012 | Miyauchi |

FOREIGN PATENT DOCUMENTS

| | | |
|---|---|---|
| JP | 2008-210301 A | 9/2008 |
| JP | 2010-073976 A | 4/2010 |
| JP | 2010-141966 A | 6/2010 |
| JP | 2010-252468 A | 11/2010 |
| JP | 2010-273473 A | 12/2010 |
| JP | 2010-284065 A | 12/2010 |

* cited by examiner

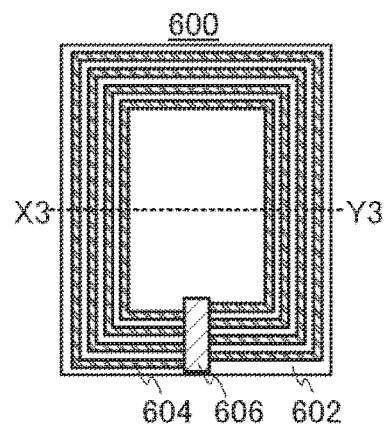
FIG. 7A
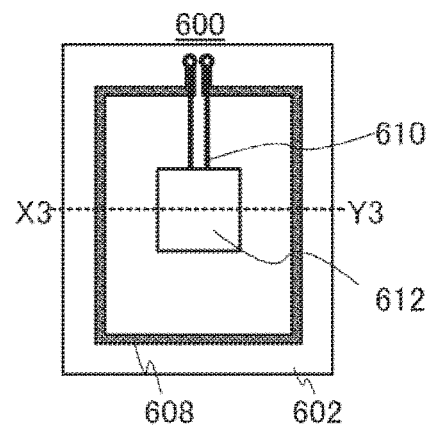
FIG. 7B
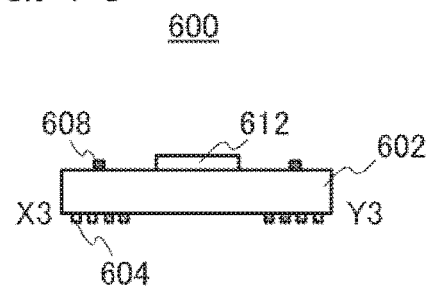
FIG. 7C
FIG. 7D
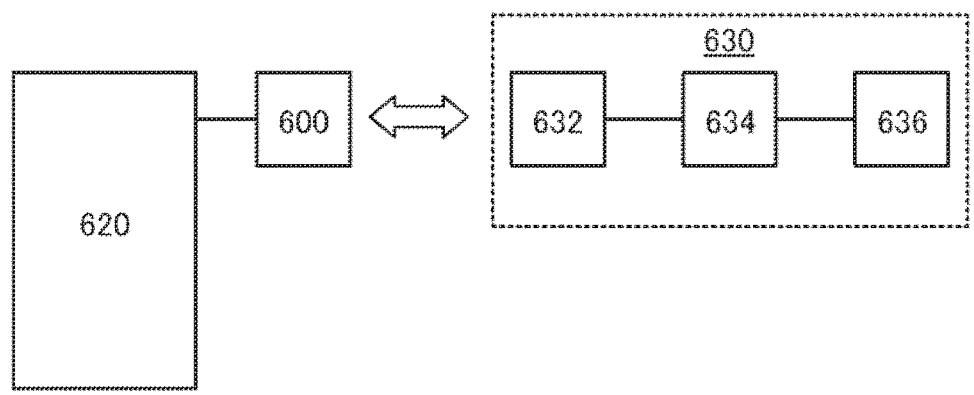

POWER-RECEIVING DEVICE, WIRELESS POWER-FEEDING SYSTEM INCLUDING POWER-RECEIVING DEVICE, AND WIRELESS COMMUNICATION SYSTEM INCLUDING POWER-RECEIVING DEVICE

BACKGROUND OF THE INVENTION

1. Field of the Invention

The present invention relates to a power-receiving device, a wireless power-feeding system including the power-receiving device, and a wireless communication system including the power-receiving device.

2. Description of the Related Art

Various electronic appliances have spread and a variety of products is shipped to the market. In recent years, the spread of portable electronic appliances such as cellular phones and digital video cameras is apparent.

A cellular phone or a digital video camera has a built-in battery serving, as a power storage means, Currently, such a battery is charged, in most cases, by bringing it in direct contact with a household AC power source serving as a power-feeding means. In view of this, research and development of methods of wirelessly charging batteries or feeding electricity to loads for improved convenience have advanced. Typical examples of methods for wireless power-feeding systems include the electromagnetic coupling method (also called electromagnetic induction method), the radio wave method (also called micro wave method), and the resonance method (also called magnetic resonance method).

A wireless power-feeding system using the electromagnetic coupling method cannot yield high transmission efficiency when a power-feeding coil in a power-feeding device and a power-receiving coil in an electronic appliance are displaced. Accordingly, a power-feeding device equipped with a plurality of power-feeding coils, and a technique to move the power-feeding coil so that it can be aligned with the power-receiving, coil have been developed (see Patent Document 1, for example).

Wireless power-feeding systems using the resonance method have attracted attention and their research and development have been promoted because they yield high transmission efficiency for middle and long distance use (see Patent Document 2, for example).

On the other hand, more and more portable electronic appliances such as recent cellular phones and smartphones function as wireless IC cards having applications such as electronic money. Since wireless IC cards need a wireless communication function, these portable electronic appliances have a built-in antenna for communication (see Patent Document 3, for example),

REFERENCE

[Patent Document 1] Japanese Published Patent Application No. 2010-273473
[Patent Document 2] Japanese Published Patent Application No. 2010-252468
[Patent Document 3] Japanese Published Patent Application No. 2008-210301

SUMMARY OF THE INVENTION

Conventionally, when a portable electronic appliance is provided with two systems, a wireless power-feeding system (hereinafter also called wireless power feeding) and a wireless communication system (hereinafter also called wireless communication), each system requires two power-receiving devices such as a coil and an antenna, leading to a problem of increased electronic appliance size and cost.

In view of this, it is an object of one embodiment of the present invention to provide a power-receiving device that yields high transmission efficiency and can be used for two systems, wireless power feeding and wireless communication.

One embodiment of the present invention employs the resonance method for less power feeding and uses a resonance coil casing the resonance method and a power-receiving coil that receives power from the resonance coil. At least one of the resonance coil and the power-receiving coil can also be used as an antenna for wireless communication. Thus, a power-receiving device that can be used for two systems, wireless power feeding and wireless communication, can be provided. The details will be given below.

One embodiment of the present invention is a power-receiving device including; a power-receiving resonance coil generating a first high-frequency voltage by a resonance method; and a power-receiving coil generating a second high-frequency voltage by using electromagnetic induction between the power-receiving coil and the power-receiving resonance coil. At least one of the power-receiving resonance coil and the power-receiving coil receives a signal on a carrier wave or an amplitude modulation wave by using electromagnetic induction. The power-receiving coil is electrically connected to a wireless power-feeding unit and a wireless communication unit. The wireless power-feeding unit includes a rectifier circuit rectifying the second high-frequency voltage, generated by the power-receiving coil, a converter electrically connected to the rectifier circuit, and a load receiving power converted by the converter. The wireless communication unit includes a reception circuit receiving the signal, a power-receiving controller controlling the signal received by the reception circuit, a modulation transistor electrically connected to the power-receiving controller, and a load modulation element electrically connected to the modulation transistor. The wireless power-feeding unit and the wireless communication unit are integrated.

One embodiment of the present invention is a power-receiving device including; a power-receiving resonance coil generating a first high-frequency voltage by a resonance method; and a power-receiving coil generating a second high-frequency voltage by using electromagnetic induction between the power-receiving coil and the power-receiving resonance coil. At least one of the power-receiving resonance coil and the power-receiving coil receives a signal on a carrier wave or an amplitude modulation wave by using electromagnetic induction. The power-receiving coil is electrically connected to a wireless power-feeding unit and a wireless communication unit. The wireless power-feeding unit includes a rectifier circuit rectifying the second high-frequency voltage generated by the power-receiving coil, a converter electrically connected to the rectifier circuit, and a load receiving power converted by the converter. The wireless communication unit includes a reception circuit receiving the signal, a power-receiving controller controlling the signal received by the reception circuit, a modulation transistor electrically connected to the power-receiving controller, and a load modulation element electrically connected to the modulation transistor. The power-receiving resonance coil and the power-receiving coil are placed to at least partly overlap with each other. The wireless power-feeding unit and the wireless communication unit are integrated.

One embodiment of the present invention is a wireless power editing system including the above-described power-receiving device and a power-transmitting device. The power-transmitting device includes a high-frequency power source generating a third high-frequency voltage, a power-transmitting coil receiving the third high-frequency voltage, and a power-transmitting resonance coil generating a fourth high-frequency voltage by using electromagnetic induction between the power-transmitting resonance cod and the power-transmitting coil. The first high-frequency voltage is generated by magnetic resonance between the power-transmitting resonance coil and the power-receiving device.

One embodiment of the present invention is a wireless communication system including the above-described power-receiving device and a communication device. The communication device includes an oscillator generating a carrier wave, a modulation circuit converting the carrier wave into an amplitude modulation wave, a matching circuit for subjecting the amplitude modulation wave to matching, and an antenna electrically connected to the matching circuit. A signal on a carrier wave or an amplitude modulation wave is transmitted and received with electromagnetic induction between the antenna and the power-receiving device.

One embodiment of the present invention can provide a power-receiving device that yields high transmission efficiency and can be used for two systems, wireless power feeding and wireless communication.

Figure 1A:
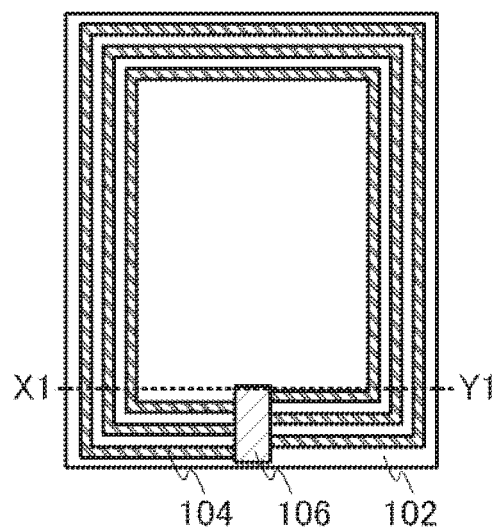
FIGS. 1A to 1C are diagrams for describing a structure according Embodiment 1.

PIG. 6 is a diagram for describing the results obtained in Example 1.

FIGS. 7A to 7D are diagrams for describing a structure according to Example 2.

DETAILED DESCRIPTION OF THE INVENTION

Embodiments of the present invention wilt be described below with reference to the drawings. Note that the embodiments can be implemented in various different ways. It will be readily appreciated by those skilled in the art that modes and details of the embodiments can be modified in various ways without departing from the spirit and scope of the present invention. The present invention therefore should not be construed as being limited to the description of the embodiments. Note that in structures of the present invention described below, reference numerals denoting the same portions are used in common in different drawings.

Note that the size and the like of each object shown in the drawings in the embodiments are exaggerated for simplicity in some cases. Each object therefore is not necessarily in such scale.

Note that, in this specification, the terms "first" to "n-th (n is a natural number)" are used only to prevent confusion between components, and thus do not limit numbers.

EMBODIMENT 1

This embodiment describes a power-receiving device according to one embodiment of the present invention with reference to FIGS. 1A to 1C, FIG. 2, and FIG. 3.

FIG. 1A is a plan view showing a power-receiving device viewed from a first surface side. FIG. 118 is a plan view showing the power-receiving device viewed from a second surface side. FIG. 1C is a cross-sectional view taken along dashed line X1-Y1 in FIGS. 1A and 1B.

Figure 1B:
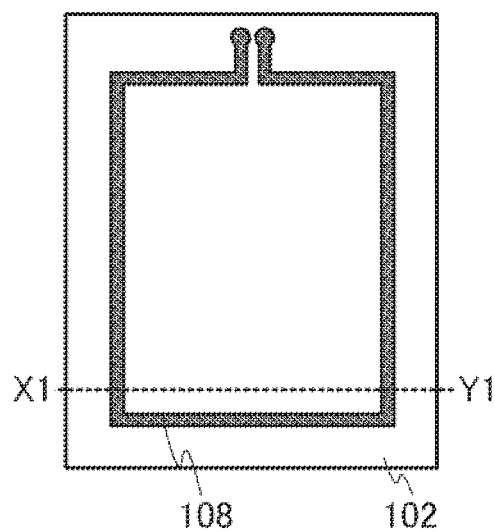
Figure 1C:
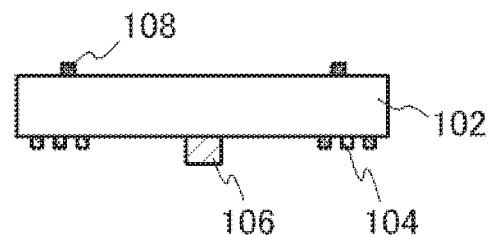

The power-receiving device shown in FIGS. 1A to 1C includes a substrate 102, a power-receiving resonance coil 104 formed over the first surface of the substrate 102, a capacitor 106 connected to the power-receiving resonance coil 104, and a power-receiving coil 108 formed over the second surface of the substrate 102.

A glass epoxy substrate, a glass composite substrate, a paper-phenolic substrate, or a flexible substrate such as a film can be used as the substrate 102.

The power-receiving resonance coil 104 formed over the first surface of the substrate 102 is brought into resonance (the resonance method) with a power-transmitting resonance coil (not shown in FIGS. 1A and 1B) in a power-transmitting device to generate a first high-frequency voltage; thus, power transmission is achieved. The power-receiving resonance coil 104 is a coil of wires made of a low-resistance material such as copper, silver, or aluminum. The use of a low-resistance material for the power-receiving resonance coil 104 is preferable because it enables power to be transmitted with high efficiency. Note that the number of turns of the coil can be adjusted as appropriate.

The capacitor 106 is an element provided to adjust the self-resonant frequency of the power-receiving resonance coil 104. Note that the capacitor 106 is not necessarily provided in the case where floating capacitance between the coil wires of the power-receiving resonance coil 104 eliminates the need for adjustment of the self resonant frequency of the power-receiving resonance coil 104. When the capacitor 106 is not provided, both ends of the coil wires of the power-receiving resonance coil 104 are open.

Power transmission to the power-receiving coil 108 formed over the second surface of the substrate 102 is achieved by generating a second high-frequency voltage with electromagnetic induction between the power-receiving coil 108 and the power-receiving, resonance coil 104 formed over the first surface of the substrate 102. It is preferable that the power-receiving resonance coil 104 and the power-receiving coil 108 be placed to at least partly overlap with each other with the substrate 102 therebetween, and the number of turns of the power-receiving coil 108 be smaller than that of the power-receiving resonance coil 104. Such placement and structure enhance magnetic coupling between the power-receiving coil 108 and the power-receiving resonance coil 104 and increase particularly short-distance power-transmission efficiency in the case of power feeding using the resonance method. Thus, the power-receiving device can receive power transmitted to the power-receiving resonance coil 104 with high efficiency.

Figure 2:
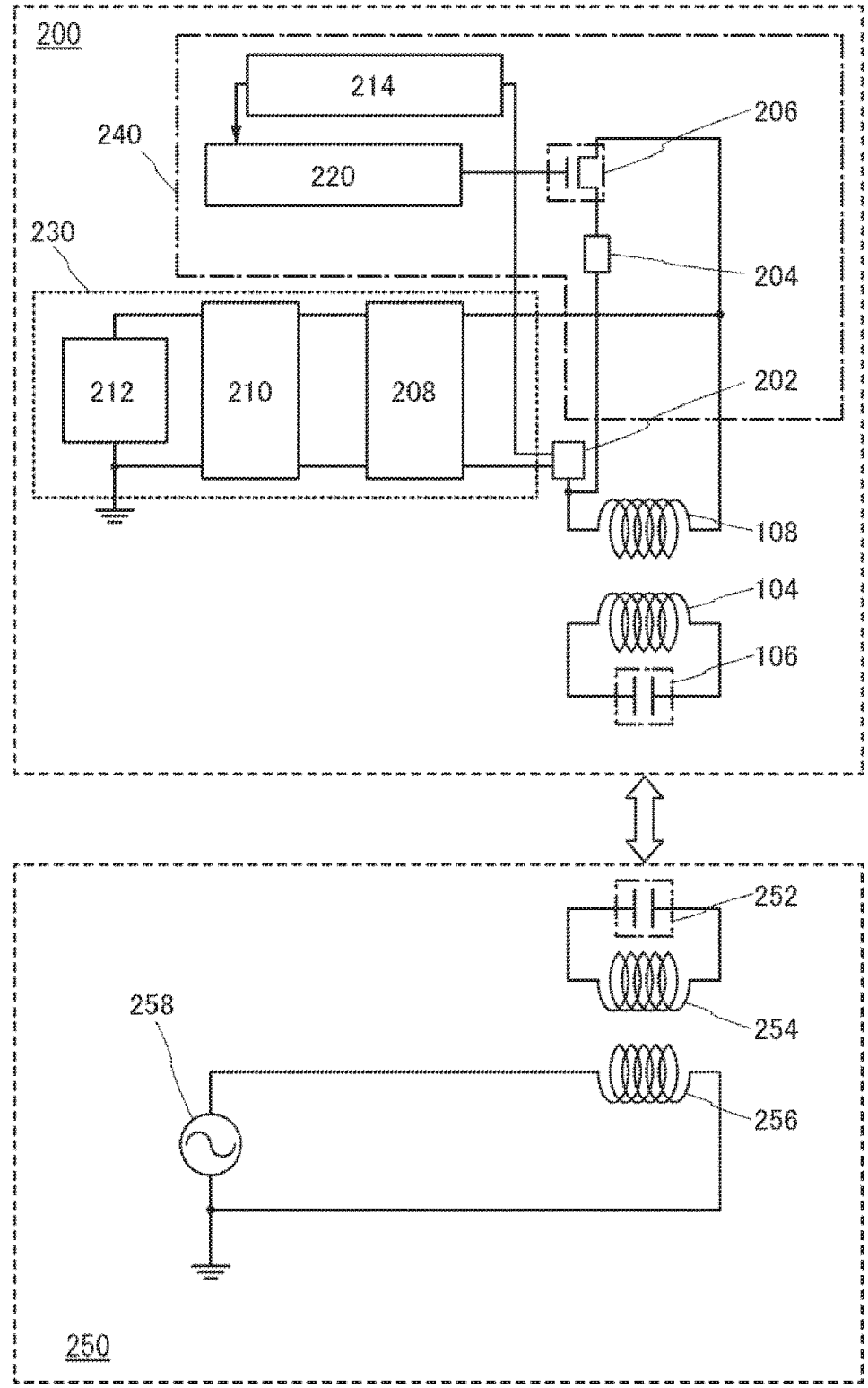
FIG. 2 is a diagram for describing a structure according to Embodiment 1.

The following describes the specific structure of the power-receiving device shown in FIGS. 1A to 1C and a wireless power-feeding system using the power-receiving device with reference to FIG. 2.

Note that a portion having the same function as that of any component in FIGS. 1A to 1C is denoted by the reference numeral of that component and its detailed description is omitted.

FIG. 2 is a block diagram showing a wireless power-feeding system using resonance between the power-receiving device shown in FIGS. 1A to 1C and a separately provided power-transmitting device 250 (the resonance method). FIG. 2 shows electromagnetic power transmission achieved by resonance between a power-transmitting resonance coil 254 in the power-transmitting device 250 and the power-receiving resonance coil 104 in a power-receiving device 200. In the block diagram of FIG. 2, the circuits in the power-receiving device 200 and the power-transmitting device 250 are classified according to their functions and shown as independent units. Note that it is actually difficult to completely separate the circuits in the power-receiving device 200 and the power-transmitting device 250 functionally; therefore, one circuit can have a plurality of functions. In other words, a plurality of circuits can achieve a function corresponding to that of one unit.

The power-receiving device 200 shown in FIG. 2 includes the power-receiving resonance coil 104 generating the first high-frequency voltage h the resonance method, and the power-receiving coil 108 the second generating high-frequency voltage with electromagnetic induction between the power-receiving coil 108 and the power-receiving resonance coil 104. At least one of the power-receiving resonance coil 104 and the power-receiving coil 108 receives a signal on a carrier wave or an amplitude modulation wave by using electromagnetic induction.

The power-receiving coil 108 is electrically connected to wireless power-feeding unit 230 and a wireless communication unit 240. The wireless power-feeding unit 230 includes a rectifier circuit 208 rectifying the second high-frequency voltage generated by the power-receiving coil 108, a DCDC converter 210 electrically connected to the rectifier circuit 208, and a load 212 receiving power converted by the DCDC converter 210. The wireless communication unit 240 includes a reception circuit 214 receiving a signal that has been received by at least one of the power-receiving resonance coil 104 and the power-receiving coil 108, a reception controller 220 controlling a signal that, has been received by the reception circuit 214, a modulation transistor 206 electrically connected to the reception controller 220, and a load modulation element 204 electrically connected to the modulation transistor 206. The wireless power-feeding unit 230 and the wireless communication unit 240 are integrated.

The power-receiving device 200 may include a directional coupler 202. The directional coupler 202 separates a modulation signal on a power-transmission carrier from the carrier and transmits the modulation signal to the reception circuit 214. Note that the directional coupler 202 is not necessarily provided. For example, when high power is transmitted, it is preferable to provide the directional coupler 202 as shown in this embodiment.

As described above, in the power-receiving device 200, the wireless power-feeding unit 230 and the wireless communication unit 240 are integrated, and the power-receiving coil 108, which is included in the power-receiving device shown in FIG. 1, is connected to a plurality of circuits and devices.

The power-transmitting device 250 includes a capacitor 252, the power-transmitting resonance coil 254, a power-transmitting coil 256, and a high-frequency power source 258.

The following describes the operation of the power-receiving device 200 and power-transmitting device 250.

Power transmission to the power-receiving device 200 is achieved by resonance between the power-receiving resonance coil 104 and the power-transmitting resonance coil 254 in the power-transmitting device 250. Power transmitted to the power-receiving resonance coil 104 is transmitted to the power-receiving coil 108 by the electromagnetic coupling method.

Power transmitted to the power-receiving coil 108 is transmitted to the load 212 via the directional coupler 202, the rectifier circuit 208, and the DCDC converter 210. In other words, power transmitted to the power-receiving coil 108 is transmitted to the wireless power-feeding unit 230.

Note that the DCDC converter 10 converts a current that has been rectified by the rectifier circuit 208 into a desired current (power) needed for the load 212 located at the subsequent stage.

The load 212 can be any device that can operate when receiving power wirelessly. Examples of such a device include a battery, an electric motor, a bulb, and an electronic device operating with a battery, such as a cellular phone.

The directional coupler 202 is electrically connected to the reception circuit 214 in the wireless communication unit 240. However, in the wireless power-feeding system, the wireless communication unit 240 in the power-receiving device 200 does not function.

In the power-transmitting device 250 the frequency (oscillation frequency) of an alternating-current (AC) signal output from the high-frequency power source 258 is applied to the power-transmitting coil 256. Power transmitted to the power-transmitting coil 256 is transmitted to the power-transmitting resonance coil 254 by the electromagnetic coupling method. The power-transmitting resonance coil 254 is provided with the capacitor 252. The self-resonant frequency of the power-transmitting resonance coil 254 can be adjusted using the capacitor 252.

Note that the frequency of an AC signal output from the high-frequency power source 258 is not limited to a particular frequency and can be any oscillation frequency with which the power-transmitting device 250 can transmit power to the power-receiving device 200 by the resonance method. The oscillation frequency in the resonance method can be used, for example, in a frequency band of several kilohertz to several gigahertz.

As described above, power generated with the high-frequency power source 258 in the power-transmitting device 250 can be transmitted with resonance between the power-transmitting resonance coil 254 and the power-receiving resonance coil 104 in the power-receiving device 200 (the resonance method). Thus, unlike wireless power-feeding using the electromagnetic coupling method, wireless power-feeding using the resonance method can widen an area where power can be fed and achieve high transmission efficiency.

Next, a wireless communication system using the power-receiving device 200 in FIG. 2 will be described with reference to FIG. 3.

Note that a portion having the same function as that of any component in FIGS. 1A to 1C and FIG. 2 is denoted by the same reference numeral as that of the component and its detailed description is omitted.

Figure 3:
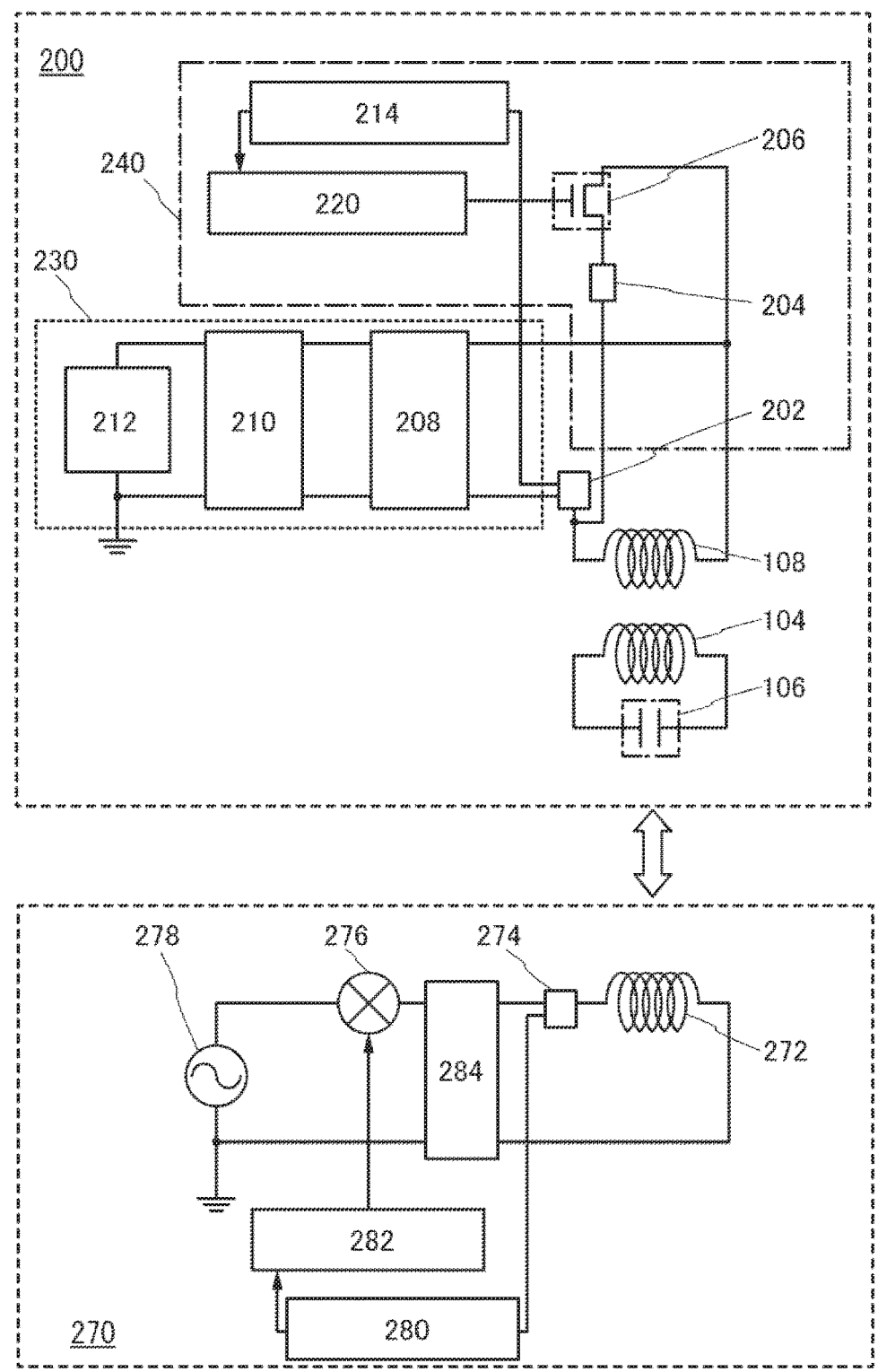
FIG. 3 is a diagram for describing a structure according to Embodiment 1.

FIG. 3 is a block diagram showing a system of wireless communication between the power-receiving device 200 shown in FIG. 2 and a separately provided communication device 270. In the block diagram of FIG. 3, the circuits in the power-receiving device 200 and the power communication device 270 are classified according to their functions and shown as independent units. Note that it is actually difficult to completely separate the circuits in the power-receiving device 200 and the power communication device 270 functionally; therefore, one circuit can have a plurality of functions. In other words, a plurality of circuits can achieve a function corresponding to that of one unit.

The power-receiving device 200 shown in FIG. 3 includes the power-receiving resonance coil 104 generating the first high-frequency voltage with the resonance method, and the power-receiving coil 108 generating the second high-frequency voltage with electromagnetic induction between the power-receiving coil 108 and the power-receiving resonance coil 104. At least one of the power-receiving resonance coil 104 and the power-receiving coil 108 receives a signal on a carrier wave or an amplitude modulation wave by using electromagnetic induction.

The power-receiving coil 108 is electrically connected to a wireless power-feeding unit 230 and a wireless communication unit 240. The wireless power-feeding unit 230 includes a rectifier circuit 208 rectifying the second high-frequency voltage generated with the power-receiving, coil 108, a DCDC converter 210 electrically connected to the rectifier circuit 208, and a load 212 receiving power that has been converted by the DCDC converter 210. The wireless communication unit 240 includes a reception circuit 214 receiving a signal that has been received by at least one of the power receiving resonance coil 104 and the power-receiving oil 108, a reception controller 220 controlling a signal that has been received by the reception circuit 214, a modulation transistor 206 electrically connected to the reception controller 220, and a load modulation element 204 electrically connected to the modulation transistor 206. The wireless power-feeding unit 230 and the wireless communication unit 240 are integrated.

The power-receiving device 200 can include a directional coupler 202. The directional coupler 202 separates a modulation signal on a power-transmission carrier from the carrier and transmits the modulation signal to the reception circuit 214. The directional coupler 202 is electrically connected to the reception circuit 214 and the reception controller 220. The reception circuit 214, can be composed of a plurality of circuits such as a low pass filter (a type of filter circuit), an amplification circuit, and a demodulation circuit.

Note that while wireless communication is carried out, the wireless power-feeding unit 230 does not function. Note that the wireless power-feeding unit 230 may have a function of, for example, referring to the amount of remaining battery or the like according to an instruction of a received signal and sending it back.

A communication device 270 includes an antenna 272, a directional coupler 274, a modulation circuit 276, an oscillator 278, a power-receiving circuit 280, a communication controller 282, and a matching circuit 284.

Note that a frequency hand produced by the oscillator 278 is not limited to a particular band and can be any frequency band as appropriate. Examples of applicable frequency bands include an HF band of 3 MHz to 30 MHz (13.56 MHz for example), a UHF band of 300 MHz to 3 GHz (433 MHz, 953 MHz, or 2.45 GHz for example), and 135 kHz.

The communication device 270 serves as a so-called reader/writer. Like the reception circuit 214 in the power-receiving device 200, the power-receiving circuit 280 can be composed of a plurality of circuits such as a low pass filter, an amplification circuit, and a demodulation circuit.

Wireless communication is carried out in the following manner. Reception of a signal on a carrier wave or amplitude modulation wave is achieved by using electromagnetic induction between the antenna 272 provided in the communication device 270 and at least one of the power-receiving resonance coil 104 and the power-receiving coil 108 provided in the power-receiving device 200, allowing wireless communication.

Specifically, in order to send data from the communication deuce 270 to the power-receiving device 200, a carrier wave is first generated with the oscillator 278 in the communication device 270. A modulation wave is then superimposed on the carrier wave with the modulation circuit 276 to generate an amplitude modulation wave. Subsequently, the amplitude modulation wave is output to the antenna 272 via the matching circuit 284 and the directional coupler 274. The amplitude modulation wave output to the antenna 272 is received by the power-receiving resonance coil 104 or power-receiving coil 108 in the power-receiving device 200. The amplitude modulation wave applied to the power-receiving coil 108 is applied to the reception controller 220 via the directional coupler 202 and the reception circuit 214. In this way, the signal can the carrier wave generated in the communication device 270 is sent to the power-receiving device 200.

In order to send back data from the power-receiving, device 200 to the communication device 270, a signal (power) is sent from the reception controller 220 in the power-receiving device 200 to the power-receiving coil 108 via the modulation transistor 206 and the load modulation element 204. The signal applied to the power-receiving coil 108 is also applied to the power-receiving resonance coil 104 with the electromagnetic coupling method. The communication device 270 receives the signal applied to the power-receiving coil 108 or the power-receiving resonance coil 104, at the antenna 272. The received signal is applied to the communication controller 282 via the directional coupler 274 and the power-receiving circuit 280. In this way, the signal from the power-receiving device 200 is sent back to the communication device 270.

In this way, the power-receiving device 200 described in this embodiment can transmit and receive a signal on a carrier wave or an amplitude modulation wave to/from the antenna 272 via at least one of the power-receiving, resonance coil 104 and the power-receiving coil 108. In other words, wireless communication can be achieved by using the power-receiving resonance coil 104 or the power-receiving coil 108.

Although this embodiment describes a structure in which the power-receiving device 200 and one of the power-transmitting device 250 and the communication device 270 are used as an example, the power-transmitting device 250 and the communication device 270 may be combined into one device.

As described above, the power-receiving device described in this embodiment can be used for two systems, a wireless power-feeding system and a wireless communication system, and yields high transmission efficiency.

This embodiment can be implemented in appropriate combination with any structure described in the other embodiments.

EMBODIMENT 2

In this embodiment, applications of a wireless power-feeding system using the power-receiving device described in the above embodiment are described. Examples of the applications of the wireless power feeding system using the power-receiving device according to one embodiment of the present invention include portable electronic devices such as a digital video camera and a personal digital assistant (e.g. a mobile computer, a cellular phone, a portable game machine, and an e-book reader). Examples will be described bellow refereeing to drawings.

Figure 4A:
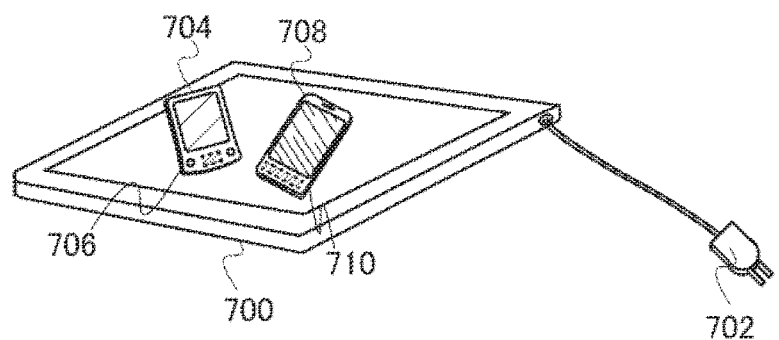
FIGS. 4A to 4C are diagrams for describing a structure according to Embodiment 2.

FIG. 4A shows an example in which a wireless power-feeding system is used for a cellular phone and a personal digital assistant and which is composed of a power-transmitting device 700, a power plug 702, and a cellular phone 704 including a power-receiving device 706, and a cellular phone 708 including a power-receiving device 710. A wireless power-feeding system using the power-receiving device described in the above embodiment is applicable between the power-transmitting device 700 and the power-receiving device 706, and between the power-transmitting device 700 and the power-receiving device 710.

For example, the power-transmitting device 700 can use the structure of the power-transmitting device 250 in FIG. 2 described in Embodiment 1, while the power-receiving device 706 and the power-receiving device 710 can use the structure of the power-receiving device 206 in FIG. 2 and FIG. 3 described in Embodiment 1. The power plug 702 is connected to an external power source (not shown).

As described above, in this embodiment, a plurality of power-receiving devices (power-receiving device 706 and power-receiving device 710) can be used for rent; power-transmitting device. The wireless power-feeding system enables power feeding using the resonance method, and thus can widen an area where power can be fed and achieve high transmission efficiency.

Figure 4B:
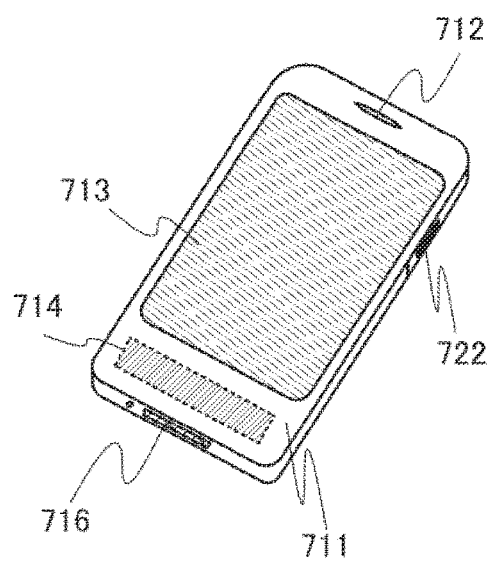
Figure 4C:
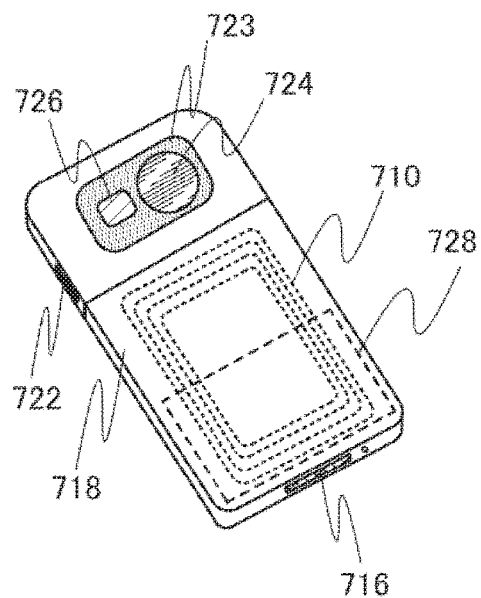

The following describes the cellular phone 708 including the power-receiving device 710 in FIG. 4A in detail with reference to FIGS. 4B and 4C. FIGS. 4B and 4C are perspective views of the cellular phone.

FIG. 4B shows the front (display surface) of the cellular phone 708 and illustrates a front housing 711, a speaker part 712, a display part 713, a microphone part 714, a terminal part 716, and a terminal part 722.

FIG. 4C shows the back of the cellular phone 708 and illustrates a back housing 718, a terminal part 716, a terminal part 722, a camera module 723, a lens part 724, and a light 726. The power-receiving device 710 aid a battery 728 are stored in the back housing 718.

For example, the power-receiving device 710 can use the structure of the power-receiving device 200 in FIG. 2 and FIG. 3 described in Embodiment 1. By using the load 212 in FIG. 2 and FIG. 3 described in Embodiment 1 as the battery 728, power received by the power-receiving device 710 can be stored in the battery 728.

Moreover, the power-receiving device 710 stored in the cellular phone 708 is capable of wireless communication as well.

As described above, the power-receiving device described in this embodiment can be used for two systems, wireless power-feeding and wireless communication, and yields high transmission efficiency.

This embodiment can be implemented in appropriate combination with any structure described in the other embodiments.

EXAMPLE 1

In Example 1, a wireless power-feeding system with a simple structure was evaluated by using the power-receiving device in FIG. 1 described in Embodiment 1. Description will be given with reference to FIGS. 5A to 5E and FIG. 6.

Figure 5A:
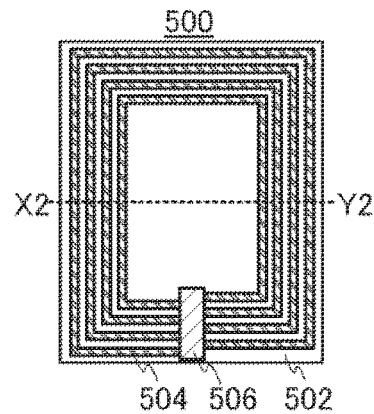
FIGS. 5A to 5E are diagrams for describing a structure according to Example 1.
Figure 5B:
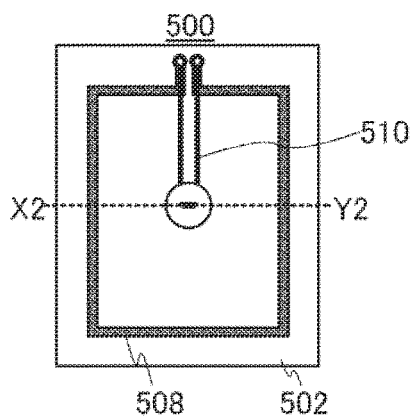
Figure 5C:
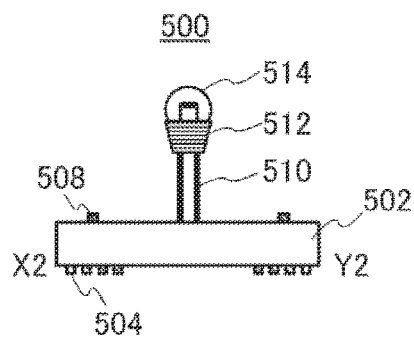
Figure 5D:
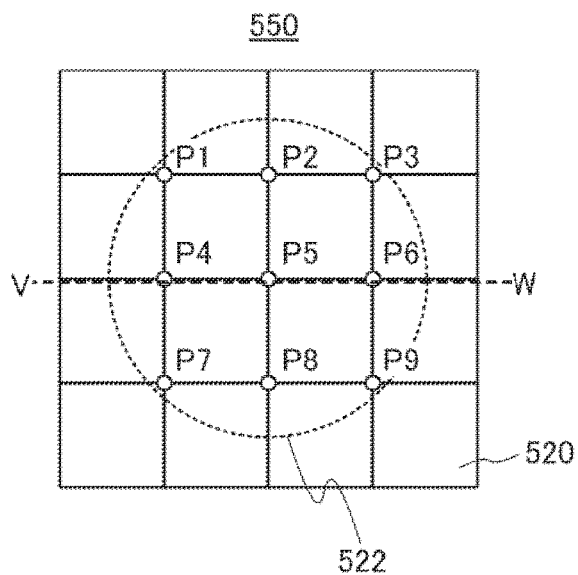
Figure 5E:
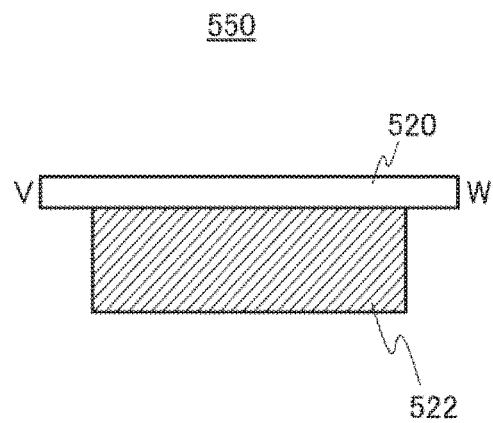

FIG. 5A is a plan view of a power-receiving device 500, which shoes a substrate 502 viewed from a first surface side. FIG. 5B is a plan view of the power-receiving device 500, which shows the substrate 502 viewed from a second surface side. FIG. 5C is a cross-sectional view taken along dashed line X2-Y2 in FIGS. 5A and 5B. FIG. 5D is a plan view of a power-transmitting device 550. FIG. 5E is a cross-sectional view taken along dashed line V-W in FIG. 5D.

The power-receiving device 500 includes the substrate 502, a power-receiving resonance coil 504, a capacitor 506, a power-receiving coil 508, wiring 510, a socket 512, and a bulb 514.

The substrate 502 is a glass epoxy substrate that measures 4.2 cm wide by 7.2 cm long by 0.7 mm thick. The power-receiving resonance coil 504 is made of copper wire and has the following specs: the coil width is 1 mm, the coil separation is 1 mm, the number of coil turns is 4, and the coil thickness is 35 μm. The power-receiving coil 508 is made of copper wire and has the following specs: the coil width is 1 mm, the number of turns is 1, and the coil thickness is 35 μm. The capacitor 506 is a RF chip capacitor having a capacitance of 59 pF. The wiring 510 is connected to the power-receiving coil 508 and is electrically connected to the bulb 514 via the socket 512. Thus, applying power to the power-receiving coil 508 lights the bulb 514.

The power-transmitting device 550 includes a power-transmitting board 520 and a power-transmitting resonance coil 522.

The power-transmitting board 520 is a Styrofoam plate that, measures 20 cm wide by 20 cm long by 1 cm thick. The power-transmitting resonance coil 522 is made of copper wire and has the following specs: the coil outer diameter is 15 cm, the coil separation is 1 cm, the number of coil turns is 3, and the coil diameter is 3 mm. Note that coordinates P1 to P9 representing measurement points spaced every 5 cm are written on the power-transmitting board 520.

The conditions for the power-transmitting device 550 are as follows the, grid power is 1 W, the oscillation frequency is 15.30 MHz, and the self-resonant frequency of the power-transmitting resonance coil 522 is 14.95 MHz.

With the above-described structure, in Example 1, wireless power-feeding was carried out by the resonance method using the power-receiving resonance coil 504 provided in the power-receiving device 500 and the power-transmitting resonance coil 522 provided in the power-transmitting device 550.

Power from the power-transmitting device 550 is applied to the bulb 514 via the power-receiving resonance coil 504, the power-receiving coil 508, the wiring 510, and the socket 512 provided in the power-receiving device 500, Note that the coordinates P1 to P9 shown in FIG. 3D were used as evaluation coordinates.

Figure 6:
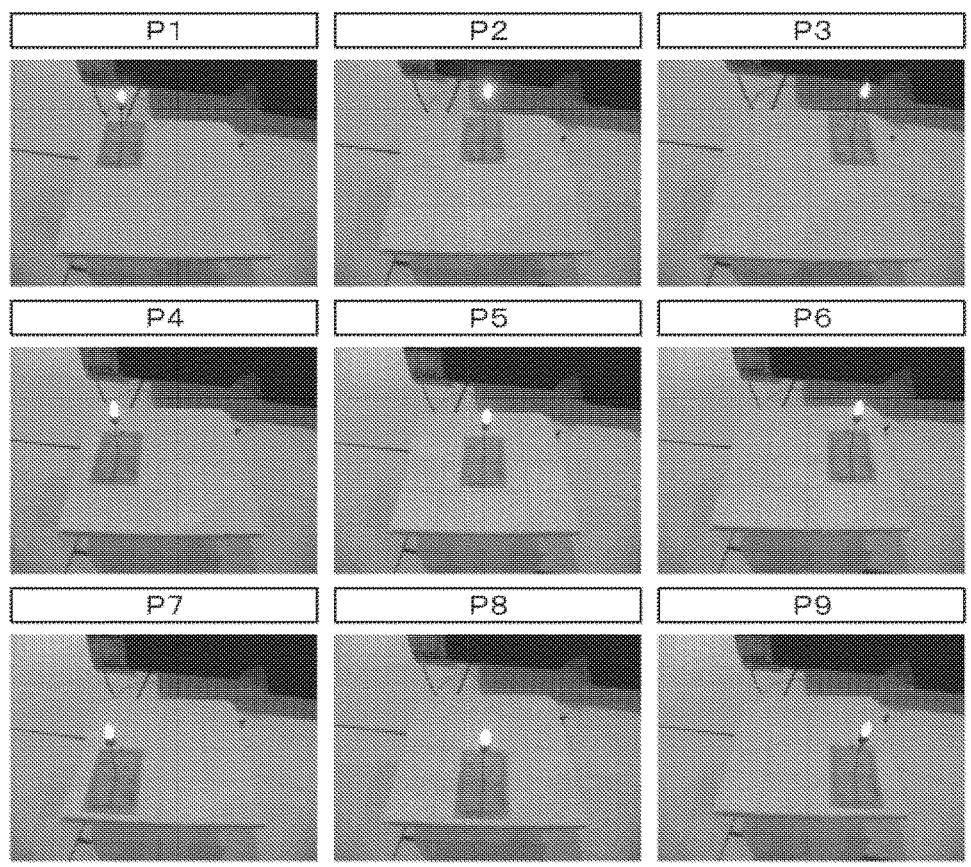

FIG. 6 shows the results of lighting tests on the bulb 514 at P1 to P9.

From FIG. 6, it was confirmed that the bulb 514 could be lit at all the coordinates P1 to P9. It was also confirmed that the brightness was approximately the same at all the coordinates and that, from the results of another measurement using the network analyzer N5230A by Agilent Technologies Inc., the transmission efficiency was as high as 80% to 95%

As described above, it was confirmed that the power-receiving device evaluated in Example 1 yielded high transmission efficiency in a wide area.

This embodiment can be implemented in appropriate combination with any structure described in Example 2 or the embodiments.

EXAMPLE 2

In Example 2, a wireless communication system with a simple structure was evaluated by using the power-receiving device in FIG. 1 described in Embodiment 1. Description will be given with reference to FIGS. 7A to 7D.

FIG. 7A is a plan view of a power-receiving device 600, which shows a substrate 602 viewed from a first surface side. FIG. 7B is a plan view of the power-receiving device 600, which shows the substrate 602 viewed from a second surface side. FIG. 7C is a cross-sectional view taken along dashed line X3-Y3 in FIGS. 7A and 7B.

The power-receiving device 600 includes the substrate 602, a power-receiving resonance coil 604, a capacitor 606, a power-receiving coil 608, a wiring 610, and a chip 612.

The substrate 602 is a glass epoxy substrate that measures 4.2 cm wide by 7.2 cm long by 0.7 mm thick. The power-receiving resonance coil 604 is made of copper wire and has the following specs: the coil width is 1 mm, the coil separation is 1 mm, the number of coil turns is 4, and the coil thickness is 35 μm. The power-receiving coil 608 is made of copper wire and has the, following specs: the coil width is 1 mm, the number of turns is 1, and the coil thickness is 35 μm. The wiring 610 is connected to the power-receiving coil 608 and is electrically connected to the chip 612. Thus, applying power to the power-receiving coil 608 operates the chip 612.

FIG. 7D is a block diagram showing wireless communication using the electromagnetic coupling method between the power-receiving device according to Example 2 and a separately provided communication device, and illustrates the power-receiving device 600, a signal analyzer 620, and a communication device 630 including an antenna 632, a communication controller 634, and a load 636. In the block diagram of FIG. 7D, the circuits in the power-receiving device and the communication device are classified according to their functions, and shown as independent units.

Note that the communication controller 634 is composed of various circuits, such as a low pass filter, a transformer, and a rectifier circuit, and devices.

The power-receiving device 600 is electrically connected to the signal analyzer 620 which is capable of conducting signal, analysis when the power-receiving device 600 wirelessly receives data.

In Example 2, an evaluation was conducted of whether the power-receiving device 600 received data, with the distance between the power-receiving device 600 and the antenna 632 provided in the communication device 630 varied between 35 mm to 300 mm and with three values of the output power of the communication device 630: 0 dBm, 10 dBm, and 20 dBm. Table 1 shows the evaluation results.

TABLE 1

|  | | Output power [dBm] | | |
| --- | --- | --- | --- | --- |
|  | | 0 | 10 | 20 |
| Distance between power-receiving device and antenna [mm] | 35 | X | ○ | ○ |
|  | 50 | X | ○ | ○ |
|  | 70 | X | ○ | ○ |
|  | 90 | ○ | ○ | ○ |
|  | 130 | ○ | ○ | ○ |
|  | 170 | Δ | ○ | ○ |
|  | 210 | Δ | Δ | ○ |
|  | 250 | X | Δ | ○ |
|  | 300 | X | Δ | Δ |

In Table 1, a circle represents the case where the power-receiving device 600 receives correct data from the communication device 630, a triangle represents the case where the power receiving device 600 receives any incorrect data from the communication device 630, and a cross represents the case where the power-receiving device 600 is to receive data from the communication device 630.

As shown in Table 1, with an output power of 0 dBm, correct data is received with a distance ranging from 90 mm to 130 mm, while partly incorrect data is received with a distance ranging from 170 mm to 210 mm. With an output power of 10 dBm, correct data is received with a distance ranging from 35 mm to 170 mm, while partly incorrect data is received with a distance ranging from 210 mm to 300 mm. With an output power of 20 dBm, correct data is received with a distance ranging from 35 mm to 250 mm, while partly incorrect data is received with a distance of 300 mm.

Thus, it was confirmed that the power-receiving device shown in Example 2 is capable of wireless communication.

This embodiment can be implemented in appropriate combination with any structure described in Example 1 or the embodiments.

This application is based on Japanese Patent Application serial No. 2011-053317 filed with Japan Patent Office on Mar. 10, 2011, the entire contents of which are hereby incorporated by reference.

What is claimed is:

1. A power-receiving device comprising:
   a first coil on a first region of a substrate, the first coil being configured to generate a first high-frequency voltage;
   a second coil on a second region of the substrate, the second coil being configured to generate a second high-frequency voltage;
   a wireless power-feeding unit electrically connected to the second coil, the wireless power-feeding unit including a battery; and
   a wireless communication unit electrically connected to the second coil, the wireless communication unit comprising:
      a reception circuit configured to receive a signal that has been received by at least one of the first coil and the second coil; and
      a reception controller configured to control the signal received by the reception circuit,
   wherein the wireless power-feeding unit and the wireless communication unit are provided over the substrate and integrated,
   wherein the substrate is a flexible substrate, and
   wherein the battery is overlapped with at least one of the first coil and the second coil.

2. The power-receiving device according to claim 1, wherein at least one of the first coil and the second coil is configured to receive the signal on one of a carrier wave and an amplitude modulation wave by using electromagnetic induction.

3. The power-receiving device according to claim 1, wherein the number of turns of the second coil is smaller than that of the first coil.

4. The power-receiving device according to claim 1, wherein the wireless power-feeding unit further includes:
   a rectifier circuit configured to rectify the second high-frequency voltage generated by the second coil; and
   a converter electrically connected to the rectifier circuit,
   wherein the battery is configured to receive power converted by the converter.

5. The power-receiving device according to claim 1, wherein the wireless communication unit further includes,
   a modulation transistor electrically connected to the reception controller, and
   a load modulation element electrically connected to the modulation transistor.

6. A system comprising:
the power-receiving device according to claim 1; and
a power-transmitting device including:
a high-frequency power source;
a third coil; and
a fourth coil.

7. A system comprising:
the power-receiving device according to claim 1; and
a communication device including:
an oscillator;
a modulation circuit;
a matching circuit; and
an antenna electrically connected to the matching circuit.

8. The power-receiving device according to claim 1, further comprising a capacitor on the first region of the substrate, the capacitor electrically connected to the first coil,
wherein the capacitor is overlapped with a part of the second coil.

9. A power-receiving device comprising:
a first coil on a first region of a substrate, the first coil being configured to generate a first high-frequency voltage;
a capacitor on the first region of the substrate, the capacitor electrically connected to the first coil;
a second coil on a second surface of the substrate, the second coil being configured to generate a second high-frequency voltage;
a wireless power-feeding unit electrically connected to the second coil, the wireless power-feeding unit including a battery; and
a wireless communication unit electrically connected to the second coil, the wireless communication unit comprising:
a reception circuit configured to receive a signal that has been received by at least one of the first coil and the second coil; and
a reception controller configured to control the signal received by the reception circuit,
wherein the wireless power-feeding unit and the wireless communication unit are integrated over the substrate, and
wherein the battery is overlapped with at least one of the first coil and the second coil.

10. The power-receiving device according to claim 9, wherein the substrate is a flexible substrate.

11. The power-receiving device according to claim 9, wherein at least one of the first coil and the second coil is configured to receive the signal on one of a carrier wave and an amplitude modulation wave by using electromagnetic induction.

12. The power-receiving device according to claim 9, wherein the number of turns of the second coil is smaller than that of the first coil.

13. The power-receiving device according to claim 9, wherein the wireless power-feeding unit further includes:
a rectifier circuit configured to rectify the second high-frequency voltage generated by the second coil; and
a converter electrically connected to the rectifier circuit,
wherein the battery is configured to receive power converted by the converter.

14. The power-receiving device according to claim 9, wherein the wireless communication unit further includes:
a modulation transistor electrically connected to the reception controller; and
a load modulation element electrically connected to the modulation transistor.

15. A system comprising:
the power-receiving device according to claim 9; and
a power-transmitting device including:
a high-frequency power source;
a third coil; and
a fourth coil.

16. A system comprising:
the power-receiving device according to claim 9; and
a communication device including:
an oscillator;
a modulation circuit;
a matching circuit; and
an antenna electrically connected to the matching circuit.

17. The power-receiving device according to claim 9, wherein the capacitor is overlapped with a part of the second coil.

18. A power-receiving device comprising:
a first coil configured to generate a first high-frequency voltage; and
a second coil configured to generate a second high-frequency voltage,
wherein at least one of the first coil and the second coil is configured to receive a signal on one of a carrier wave and an amplitude modulation wave by using electromagnetic induction,
wherein the second coil is electrically connected to a wireless power-feeding unit and a wireless communication unit,
wherein the wireless power-feeding unit includes:
a rectifier circuit configured to rectify the second high-frequency voltage generated by the second coil;
a converter electrically connected to the rectifier circuit; and
a battery configured to receive power converted by the converter,
wherein the wireless communication unit includes:
a reception circuit configured to receive the signal;
a reception controller configured to control the signal received by the reception circuit;
a modulation transistor electrically connected to the reception controller; and
a load modulation element electrically connected to the modulation transistor,
wherein the wireless power-feeding unit and the wireless communication unit are integrated, and
wherein the battery is overlapped with at least one of the first coil and the second coil.

19. The power-receiving device according to claim 18, wherein the number of turns of the second coil is smaller than that of the first coil.

20. A wireless power-feeding system comprising:
the power-receiving device according to claim 18; and
a power-transmitting device including:
a high-frequency power source configured to generate a third high-frequency voltage;
a third coil configured to receive the third high-frequency voltage; and
a fourth coil configured to generate a fourth high-frequency voltage by using electromagnetic induction between the third coil and the fourth coil,
wherein the first high-frequency voltage is generated by magnetic resonance between the fourth coil and the power-receiving device.

21. A wireless communication system comprising:
the power-receiving device according to claim 18; and
a communication device including:
- an oscillator configured to generate the carrier wave;
- a modulation circuit configured to convert the carrier wave into the amplitude modulation wave;
- a matching circuit configured to subject the amplitude modulation wave to matching; and
- an antenna electrically connected to the matching circuit, wherein the signal on the carrier wave or the amplitude modulation wave is transmitted and received with electromagnetic induction between the antenna and the power-receiving device.

22. The power-receiving device according to claim 18, further comprising a capacitor electrically connected to the first coil,
wherein the capacitor is overlapped with a part of the second coil.

\* \* \* \* \*